May 29, 1934.  A. H. OELKERS  1,960,314
ROLLER BEARING ASSEMBLY
Filed Jan. 11, 1930
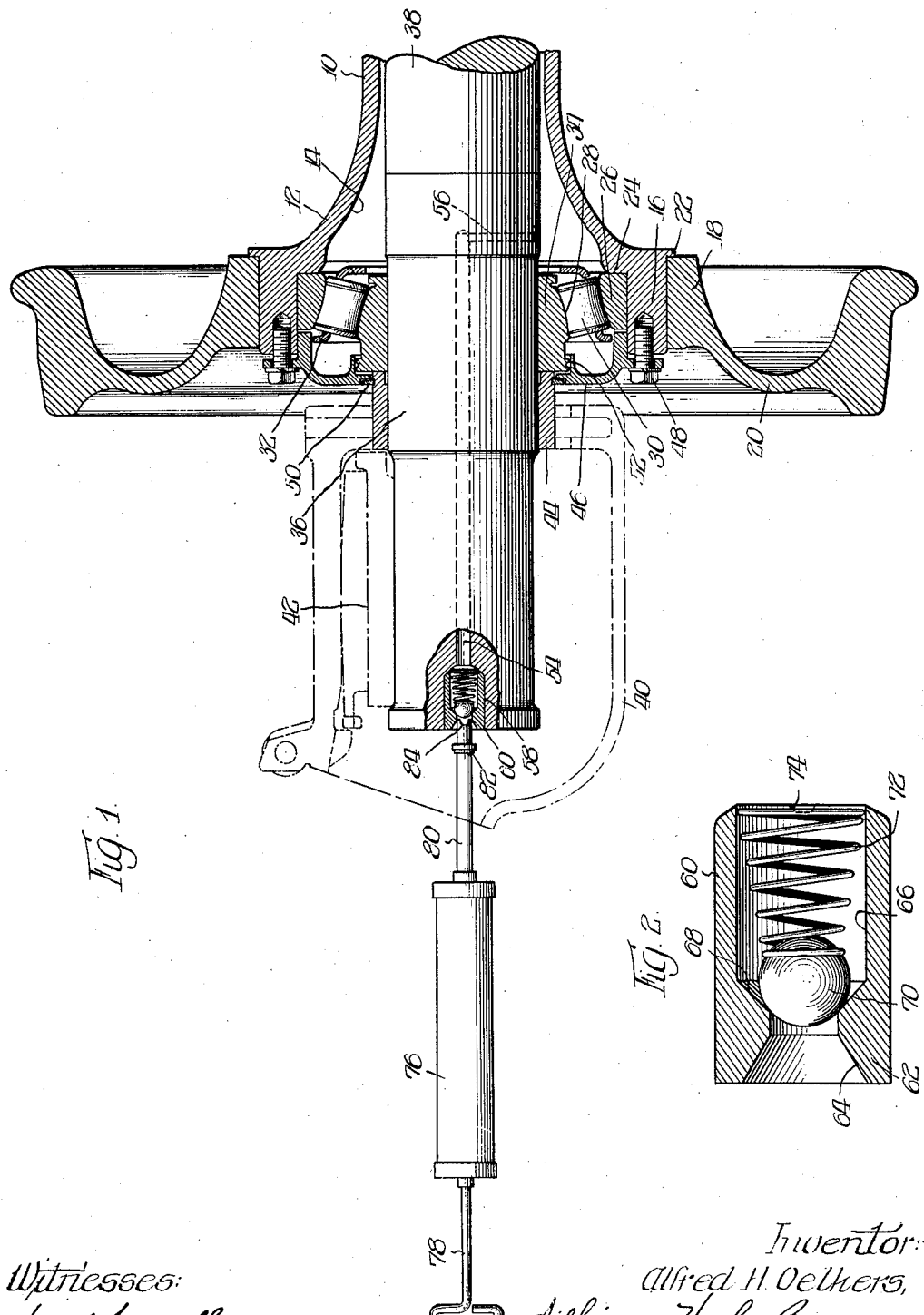
Inventor:
Alfred H. Oelkers,

Patented May 29, 1934

1,960,314

UNITED STATES PATENT OFFICE 1,960,314

ROLLER BEARING ASSEMBLY

Alfred H. Oelkers, Chicago, Ill., assignor to American Steel Foundries, Chicago, Ill., a corporation of New Jersey Application January 11, 1930, Serial No. 420,045

1 Claim. (Cl. 308—180)

This invention pertains to wheel and axle assemblies, and more particularly to a railway wheel and axle assembly utilizing anti-friction bearings and wherein lubricating means is provided whereby lubricant may be forced to the bearings.

With the provision of satisfactory railway wheel and axle assemblies using anti-friction bearings, the problem of lubricating the bearings was presented. In general, the more satisfactory wheel and axle assemblies include an outer revoluble spool formed of an outer axle with flared ends on which wheels are non-rotatively mounted. The flared ends of the axle form lubricant recesses in which the anti-friction bearings are mounted, said bearings being in cooperative relation with an inner, normally non-rotatable axle extending through the spool and mounted at the ends in the usual journal boxes. The outer ends of the spool are closed by cover plates, and, as the inner axle is generally of solid construction, it will be appreciated that the problem of satisfactorily supplying fresh lubricant to the lubricant recesses is not a simple one, though a most important one.

It is, of course, not entirely feasible to merely provide a lubricant entrance in the outer axle because, while this is fairly satisfactory when the units are unassembled with a vehicle, still, when assembled, such entrances are too inaccessible. It is also desirable that lubricant can be supplied to anti-friction bearings, and the emergency journal box lubricant inspected in a single operation.

In providing means for supplying lubricant to anti-friction bearings it is, of course, necessary to drill the inner axle. This must be done with a minimum of labor to save costs. Also, it has been found that after a period of use it is necessary to mount the inner axle in a lathe to machine the bearing portions, and it is desirable and necessary that some means be provided for the support thereof.

It is therefore an object of the invention to provide a railway wheel and axle assembly having a plurality of axles between which anti-friction bearings are provided, one of said axles being provided with means located adjacent the end thereof whereby lubricant can easily and quickly be supplied to said bearings.

Another object is to provide lubricating means for anti-friction bearings of railway wheel and axle assemblies which are self-closing to prevent introduction of foreign matter to said bearings.

Still another object is to provide lubricating means for anti-friction bearings of railway wheel and axle assemblies, which means fulfills the secondary need for lathe centers for one of the axles.

A further object is to provide lubricating means for anti-friction bearings of railway wheel and axle assemblies, which means is easy to apply, is effective in operation, and can be easily applied to existing assemblies as well as to special assemblies.

A still further object is to provide lubricating means for anti-friction bearings of railway wheel and axle assemblies which can be accessible through the usual journal box.

With these and various other objects in view, the invention may consist of certain novel features of construction and operation, as will be more fully described and particularly pointed out in the specification, drawing and claim appended hereto.

In the drawing, which illustrates an embodiment of the device and wherein like reference characters are used to designate like parts—

Figure 1 is a fragmentary sectional elevation through one end of a railway wheel and axle assembly embodying the invention showing the lubricating gun in position to be applied to the lubricating means for supplying lubricant to the anti-friction bearings; and Figure 2 is an enlarged sectional elevation of the oil plug used with the assembly illustrated in Figure 1.

In the construction shown, as each end of the axle assembly is the same, description of one will suffice. The outer rotary axle 10 is flared at the end as at 12, forming the lubricant recess 14, said end being formed with the hub 16 on which the hub 18 of the wheel 20 is pressed for rotation with the axle, the wheels and axle forming a spool. The hub 16 is formed with the wheel limiting shoulder 22, and the outer race or cup shoulder 24 for limiting the inward movement of the cup 26 of the roller bearing assembly 28. The roller bearing assembly includes the rollers 30 held in cages 32 and adapted to cooperate with inner race rings or cones 34. The cone 34 is pressed on the bearing portion 36 of the inner normally non-rotatable axle 38, said axle extending into the standard journal box 40 and cooperating therewith through the usual brass and wedge arrangement 42, the journal box being suitably mounted in a side frame. A shrink ring 44 is shrunk or press fitted to the bearing portion 36 and cooperates with the cone to maintain the same in operative position. A cover plate 46 is secured by bolts 48 to the hub 16 and serves to close the lubricant recess 14, said cover plate cooperating with the baffle ring 50, and being provided with the inwardly extending flange 52 for preventing escape of lubricant and for pumping lubricant to the bearings when the assembly is in motion, all as described in application Ser. No. 409,494, filed November 25, 1929.

In order to keep lubricant in the recess, the axle 38 is bored to form a channel 54, the same extending along the center line of the axle and to a point inwardly of the bearings 28. The channel 56 then forms communication between channel 54 and the lubricant recess 14. In case the channel 56 is not in vertical position, provision (not shown) may be made to rotate the axle 38 such as described in application Ser. No. 335,647, filed January 28, 1929, and the lubricant supplied in the correct amount by first injecting and then sucking back until air is sucked which indicates that the oil level is substantially that of the lower part of the cover plate opening adjacent the inner axle.

The outer end of the channel 54 is enlarged as at 58 to receive the oil plug 60. Said plug includes the housing 62 formed with the conical opening 64, and the enlarged cylindrical opening 66, having a conical seat 68, for the ball valve 70. The ball 70 is normally held in seated position by means of the conical spring 72, said spring being full wound at each end, the larger end being secured to the housing by means of the burrs 74 formed on the edge of the housing.

The lubricating gun 76 is of the plunger type having an operating handle 78 for forcing lubricant through the discharge nozzle 80, said nozzle being provided with a limiting shoulder 82 adapted to limit inward movement of the ball 70 as it is forced off its seat by the nozzle 80. The edges of the nozzle 80 are cut out at intervals as at 84 so that lubricant can be forced past the ball 70 and to the lubricant recess 14 through channels 54 and 56, the excess lubricant being sucked back by reversing the pump plunger.

With such construction it will be seen it is possible to lubricate the bearings from the axle end or through the journal box, and at the same time inspect the journal box lubricant and packing. Also, due to the disposition of channel 54 it can easily and cheaply be bored, and due to the formation of the oil plug it can serve as a lathe center in machining the axle or its associated parts.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claim.

I claim:

In a wheel and axle assembly, the combination of a rotatable axle, a normally non-rotatable axle extending through said rotatable axle and having a journal end adapted to be received and enclosed by a standard journal box, said rotatable axle having an enlarged portion provided with a lubricant recess, a wheel mounted on the enlarged portion of said rotatable axle, antifriction bearings mounted in said lubricant recess between said axles, and a channel axially disposed in said second named axle enterable from said journal box and communicating with a channel disposed inwardly of said bearings for introducing lubricant to said lubricant recess.

ALFRED H. OELKERS.